March 27, 1934.   C. H. HAVILL   1,952,802
PROPELLER
Filed May 29, 1931   3 Sheets-Sheet 1

Inventor
Clinton H. Havill
By F. B. Smith.
Attorney

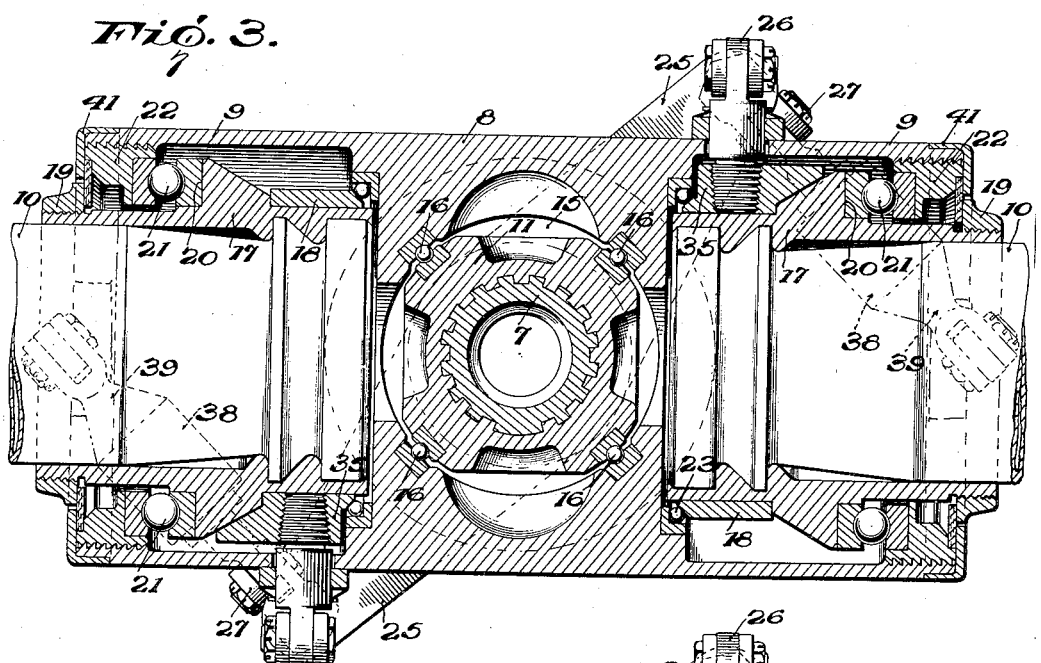
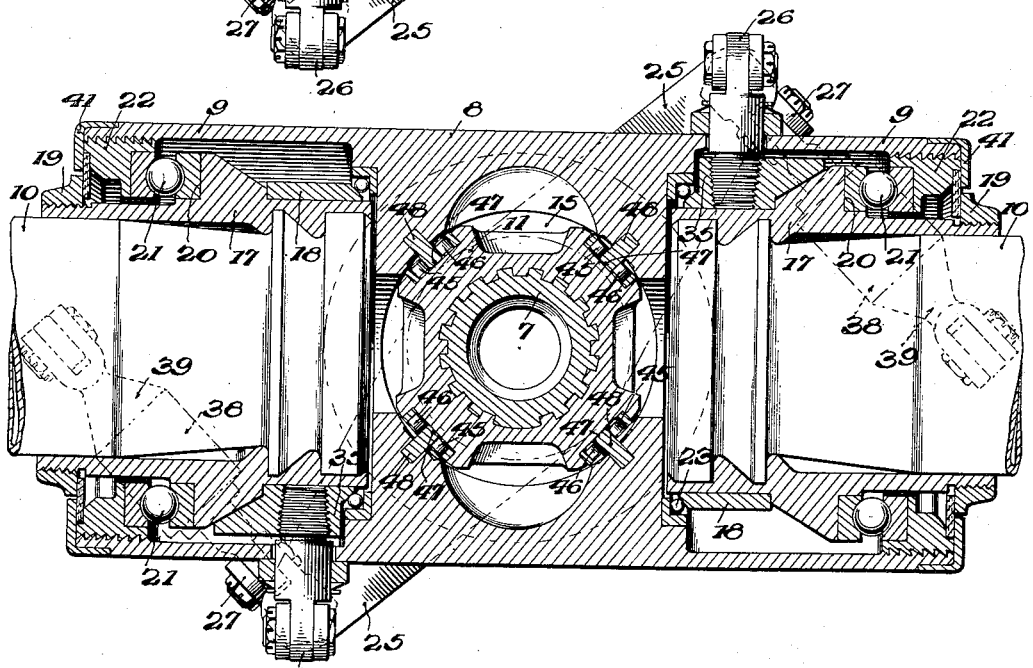

March 27, 1934.  C. H. HAVILL  1,952,802
PROPELLER
Filed May 29, 1931   3 Sheets-Sheet 3

Inventor
Clinton H. Havill
F. B. Smith
Attorney

Patented Mar. 27, 1934

1,952,802

UNITED STATES PATENT OFFICE 1,952,802

PROPELLER

Clinton H. Havill, South Orange, N. J., assignor to Bendix Research Comporation, East Orange, N. J., a corporation of Indiana Application May 29, 1931, Serial No. 541,036

15 Claims. (Cl. 170—162)

This invention relates to propellers and more particularly to that class of propellers wherein the pitch or angularity of the blades may be varied during operation.

It has heretofore been proposed to employ variable pitch propellers, especially adaptable for use on aircraft, wherein the pitch of the blades is automatically varied during operation of the propeller, and more specifically certain of these variable pitch propellers have heretofore been automatically operated in accordance with the thrust of the blades and have included a hub structure, drivably connected with an engine shaft or extension thereof, but longitudinally movable with respect thereto. In order to effect the drivable connection between the hub and shaft and also to permit relative longitudinal movement therebetween in an efficient manner while in operation, it has been proposed to employ in variable pitch propellers of this character a plurality of rows of ball bearings interposed between the hub and shaft. In prior constructions, however, it has been determined that the above-mentioned bearings are subject to great wear, due to the fact that the same serve to transmit all of the driving torque of the engine shaft to the hub and propeller blades.

It is accordingly one of the objects of the present invention to provide a variable pitch propeller so constructed as to avoid the above difficulties and disadvantages.

Another object of the invention is to provide in a variable pitch propeller having a plurality of blades the pitch of which is automatically varied during operation, a novel construction whereby the drivable connection between the propeller shaft and hub is relieved of a large portion of its torque load due to the driving torque of the shaft.

Still another object is to provide in a variable pitch propeller embodying a hub movable longitudinally of the propeller shaft in response to the thrust of the blades for automatically varying the pitch of the latter, novel means including a pair of drivable connections between the propeller shaft and hub, one of said connections being adapted to relieve the torque stresses in the other driving connection due to the driving torque of the shaft.

A further object is to provide in a thrust-actuated variable pitch propeller of the above character, a driving connection between the propeller shaft and hub including a member initially under tension, in order to substantially counteract the torque load in the driving connection between the shaft and hub interiorly of the latter.

A still further object is to provide in a propeller of the above character, a novel bearing construction interposed between the propeller shaft and hub whereby increased bearing surface may be obtained without materially increasing the weight of the propeller.

A further object is to provide a novel variable pitch propeller having a simple and compact arrangement of parts whereby the same is rendered unusually efficient in operation and light in weight, thus rendering the propeller especially adaptable for use on aircraft.

Other objects and novel features of the invention will appear more fully hereinafter from the following detailed description when taken in connection with the accompanying drawings wherein are illustrated several embodiments of the invention. It is to be expressly understood, however, that the drawings are for purposes of illustration only and are not designed as a definition of the limits of the invention, reference being had for this purpose to the appended claims.

In the drawings, wherein similar reference characters refer to like parts throughout the several views:

Fig. 3 is a front view in section of the propeller;

Fig. 4 is a view similar to Fig. 3 but illustrating a modified form of the bearing structure between the hub and shaft;

Figure 1:
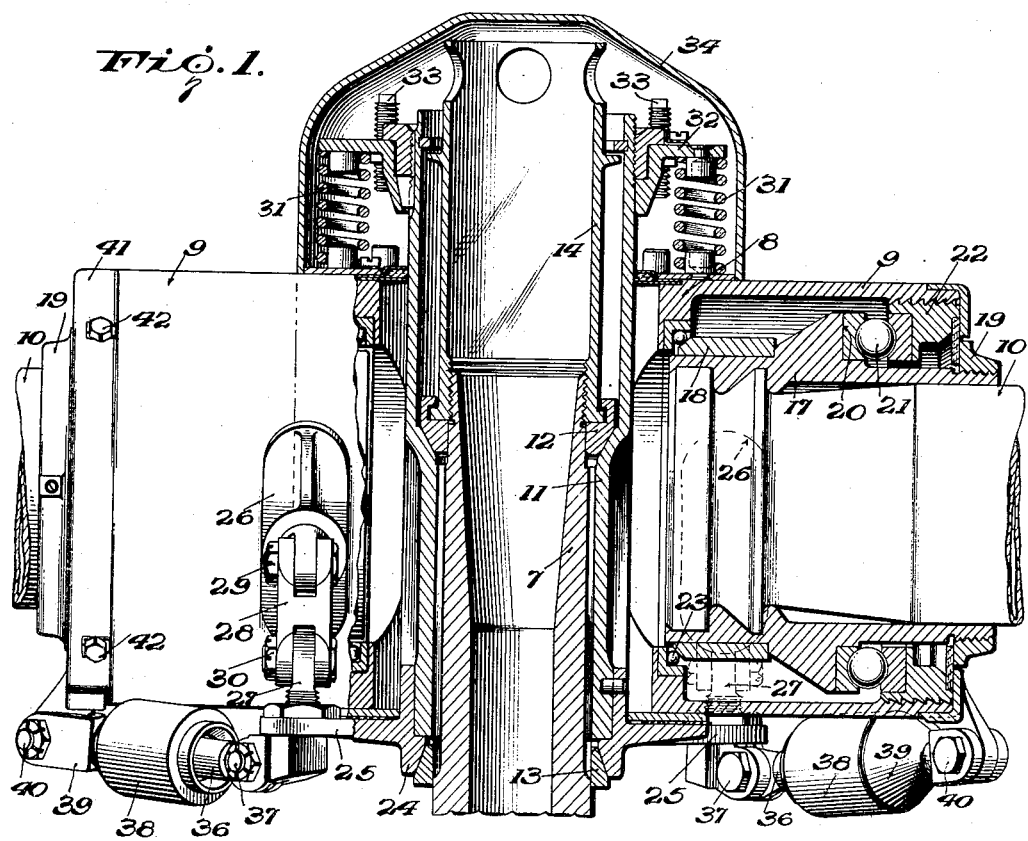
Fig. 1 is an axial view partly in section of a propeller embodying the present invention.

Referring more particularly to Fig. 1, a propeller embodying the principles of the present invention is illustrated therein as being constituted by an engine shaft 7 or extension thereof, and a hub 8 having a plurality of sockets 9 adapted to rotatably receive the inner or root ends of propeller blades 10, the said hub being drivably connected with the driving shaft, and movable longitudinally with respect thereto in response to the thrust of the blades, suitable means being provided for rotating the blades 10 in the sockets 9 to vary the pitch of said blades during such relative longitudinal movement between the hub and shaft, as will appear more fully hereinafter.

In order to drivably connect the hub 8 to the shaft 7, a driving block 11 is splined to the latter, Figs. 1 and 3, and is maintained in fixed relation therewith as by means of split front and rear cones 12 and 13 respectively and a nut 14, threadedly received by the outer end of the shaft 7 and locked to a forwardly extending portion of the driving block in any suitable manner. The hub 8 is provided with a central aperture or opening 15, Figs. 3 and 4, which is adapted to receive the driving block 11, and a plurality of rows of suitable bearings 16 are interposed between the driving block and hub in order to permit substantially frictionless relative longitudinal movement between these two members, it being pointed out that the bearings 16 serve to transmit the driving torque from the shaft to the hub to rotate the latter, together with the blades carried thereby.

Means are provided for rotatably mounting the inner or root ends of the blades 10 within the sockets 9, and preferably such means are so constituted as to enable the employment of the type of propeller blade now used in practice. As shown, such means include a split sleeve 17, the interior surface of which conforms substantially to the exterior surface of the blade root, the two portions of the sleeve being firmly secured together by means of an inner ring 18 and an outer threaded ring 19. The exterior surface of the sleeve is formed to provide an annular shoulder 20 adapted to form an inner seat for an annular row of ball thrust bearings 21, the outer seat for said bearings being carried by a thrust ring 22, threadedly received in the outer ends of each of the hub sockets 9 and serving to maintain the propeller blades 10 securely within said sockets. Preferably there is also provided a plurality of ball bearings 23 disposed at the inner end of each socket, between the hub and the ring 18, to decrease the resistance to rotation of each blade in its respective socket.

Means are provided for rotating each blade in its respective socket for varying the pitch, during longitudinal movement of the hub with respect to the shaft in response to the thrust exerted by the blades while in operation. As shown, such means are constituted by a link mechanism, Fig. 2, one end of which is operatively connected with the ring 18 secured to the root end of the blade 10, while the other end is operatively connected with a plate member 24 through lateral extensions 25 integrally formed therewith, the member 24 being rigidly secured to the driving block 11 in any suitable manner, and being preferably disposed rearwardly of the hub 8. More particularly, the aforesaid link mechanism includes a stud 26, secured to the ring 18, and a bolt 27 secured to extension or arm 25, and the stud and bolt are operatively associated by a link 28 having pivoted connection with said stud and bolt as by means of bolts 29 and 30 respectively. From this construction it will readily be observed that during forward thrust-responsive movement of the hub relative to the shaft and driving block secured thereto, each blade will be rotated in its respective socket to vary the angularity or pitch thereof.

In order to yieldingly oppose forward movement of the hub with respect to the shaft and in order to arrest such movement at certain positions along the shaft in accordance with the degree of thrust exerted by the blades under various conditions, there is preferably provided a plurality of resilient members such as for example, coil springs 31 arranged concentrically with respect to the shaft and interposed between the hub 8 and a plate 32 secured in any suitable manner to the forwardly extending portion of the driving block 11. If desired, a plurality of adjustable stops 33 carried by the plate 32 may be provided for positively limiting the forward movement of the hub, the said stops thus serving to limit the decrease in pitch of the blades; it being pointed out that when the parts are in the position shown in Fig. 1, the pitch of the blades is a maximum, the pitch being gradually reduced during forward movement of the hub until the latter contacts with the stops 33. A suitably shaped housing or nosepiece 34 preferably carried by the hub, encloses the springs 31 and serves to increase the aerodynamical efficiency of these parts as well as to protect the latter from rain, snow, etc.

Figure 2:
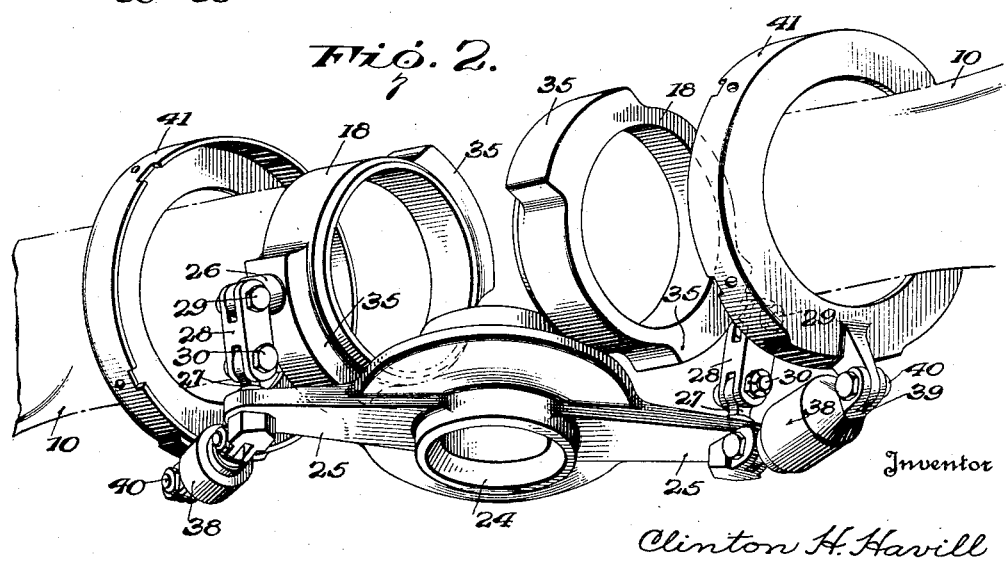
Fig. 2 is a perspective view of certain of the parts shown in Fig. 1.
Figure 6:
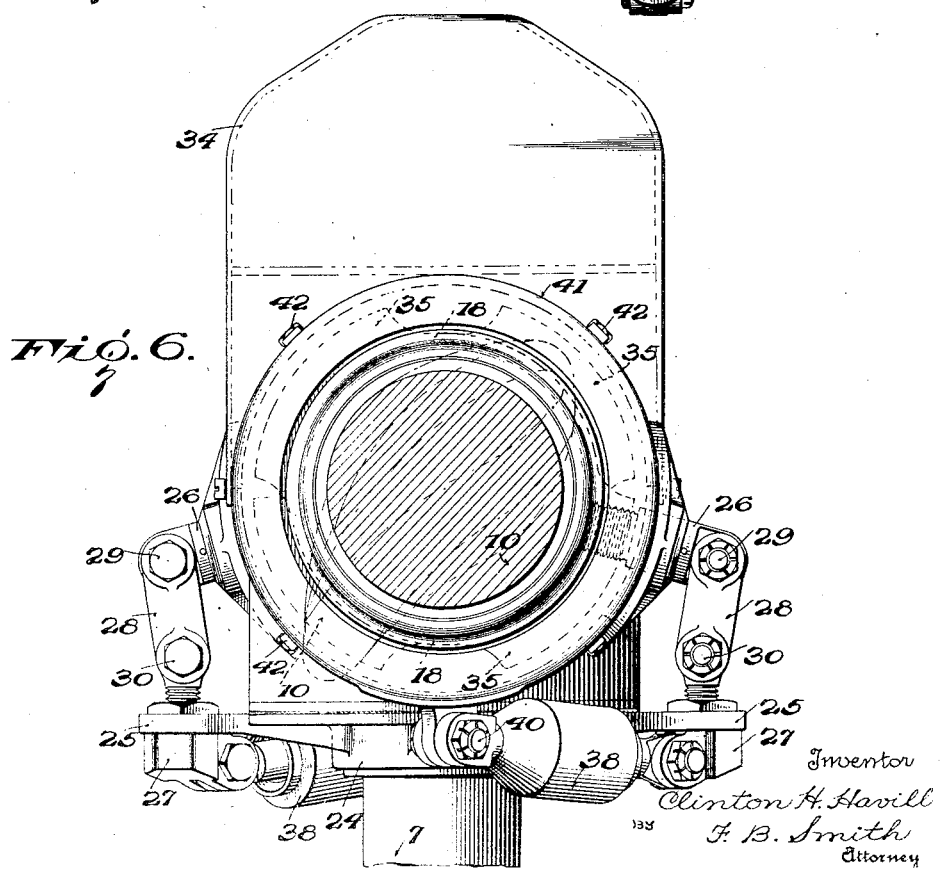
Fig. 6 is an end view of the parts shown in Fig. 1.

In order to substantially neutralize and compensate the propeller from the effects of torsion on the propeller blades, the net effect of which during operation is to constantly tend to decrease the pitch of the blades, or as viewed in Fig. 6, to move the hub forwardly and thus turn the blade 10 in a clockwise direction, the rings 18 associated with the root of each blade are counterweighted or enlarged at diametrically opposed sides as indicated at 35, (see also Fig. 2). The effect of these counterweights, as will be more particularly pointed out hereinafter, is to oppose the net effect of torsion on each respective blade while the propeller is rotating.

As heretofore pointed out, the bearings 16 which are positioned interiorly of the hub 8 and which serve to drivably connect the shaft and propeller hub, are subject to severe torque loads and compression strains during operation due to the driving torque of the engine shaft. There is therefore provided, by the present invention, means for relieving or counteracting such strains, and in the form shown, such means is constituted by a second drivable connection between the shaft and hub, positioned exteriorly of the latter and preferably including a member under initial tension. More particularly, such means includes a rod member 36, Fig. 5, pivotally connected at one end to the bolt 27, as by means of bolt 37, the other end of said rod member being received within a hollow portion 38 of an arm 39, pivotally connected by means of a bolt 40 to a ring 41 secured as by screws 42 to the hub socket 9. The above-described members 36, 38 and 39 constitute a tension member, and in order to effect a tension between these parts, an expansible spring 43 is positioned within the hollow portion 38 encircling rod 36 and confined between a washer 44 secured to the rod, and a plug 45 adjustably secured to the outer end of portion 38. It is to be pointed out that the plug 45 is adjustable in order to vary the compression of the spring 43 and hence the tension in the tension members 36, 38 and 39. From the above construction it will be readily understood that spring 43 is effective to normally tend to bring members 36 and 38 closer together and hence to rotate the hub 8 clockwise, and the shaft and driving block connected therewith, in a counterclockwise direction. In operation the shaft 7 is rotated clockwise as denoted by the arrow $a$, Fig. 5, and since the tendency of the hub, due to its inertia, would be to lag behind the shaft, thus tending to rotate counterclockwise, which tendency imposes a tremendous torque load on the bearings 16, it will be seen that the action of the above described tension member is effective to substantially counteract and relieve the bearings of a portion of this load.

Figure 5:
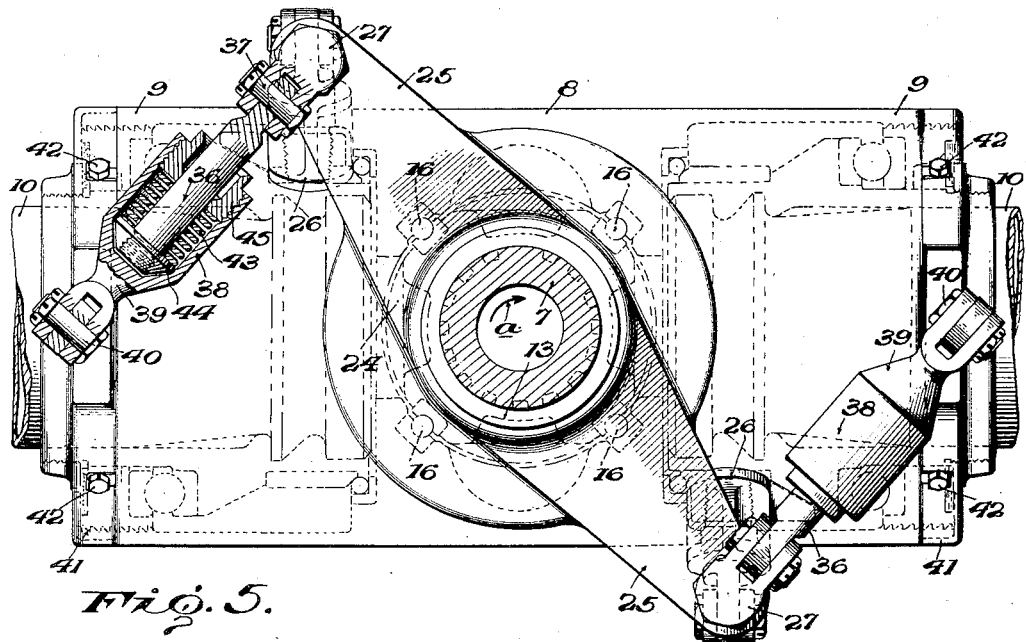
Fig. 5 is a rear view of the propeller.

During operation of a propeller constructed as set forth above and considering the shaft 7 to be rotated in a clockwise direction, as viewed in Fig. 5, the hub 8 and blades 10 rotatably carried thereby will be moved forwardly with respect to the shaft, in response to the thrust of said blades, and during such movement of the hub the link mechanisms 26—30 will be effective to vary the pitch of each respective blade, the rotation of the latter in their associated sockets during such pitch changing operation being facilitated by the utilization of bearings 21 and 24, Figs. 1, 3 and 4. The springs 31, interposed between the forward portion of the shaft and the hub, will be effective during the above thrust-responsive movement of the hub, to yieldingly resist such movement, it being pointed out that these springs are designed in such a manner as to arrest the forward travel of the hub in such a position as to yield maximum propeller efficiency for the thrust exerted by the blades under the given conditions.

Referring more particularly to Fig. 6, as heretofore pointed out, during operation torsion on the blades will tend to reduce the pitch thereof and as viewed in this figure, will tend to rotate the blade 10 therein shown, in a clockwise direction thus placing links 28 in compression and moving the hub forwardly of the shaft 7 wherein the pitch of the blades will be a minimum. However, the effect of centrifugal force on the weighted portions 35 of the rings 18 secured to the root end of the blade will tend to turn the latter in a counterclockwise direction, thus substantially counteracting the above referred to torsion, the degree of counteraction being of course dependent upon the weight of portions 35, as well as speed of rotation of the propeller and other variables as well understood in the art.

The tension member, constituted by members 36 and 38 which are interconnected between the hub and shaft, is effective, as above stated, to relieve the bearings 16, Fig. 5, from a large portion of the torque stresses imposed thereon due to the driving torque of the shaft, it thus being apparent that these bearings are thus more efficient to reduce the friction between the driving block and hub during relative movement therebetween.

In Fig. 4, there is illustrated a modified form of driving connection which may be employed between the driving block 11 and the hub 8 and this connection is preferably constituted in such a manner as to provide increased bearing surface without materially increasing the weight of the propeller. As shown, such connection comprises a plurality of rows of roller bearings 45 and 46 which are seated in longitudinally extending recesses 47 provided in the driving block 11, each of the rows of bearings 45 and 46 being disposed on either side of a key member or metal insert 48, extending longitudinally of the hub 8 and rigidly carried thereby, such connection effecting an efficient driving connection between the hub and driving block.

There is thus provided by the present invention a novel variable pitch propeller of the type wherein variation of the pitch of the blades is secured by automatic longitudinal movement of the hub relative to the propeller shaft and embodying novel means for relieving the driving connection between the hub and shaft of a major portion of the torque load between these parts due to the torque of the propeller shaft. The provision of the tension members pivotally connected between the shaft and hub enables the above-named result to be effected in a simple and efficient manner, and moreover provides a safety feature in that these members constitute a drivable connection between the shaft and hub exteriorly of the latter for rotating the propeller in the event that the driving connection between these two parts interiorly of the hub should fail. It is to be noted that relative longitudinal movement of the hub and shaft will be permitted due to the pivotal connection of the tension members between the shaft and hub respectively and to the fact that such members include a resilient connection therebetween. The construction providing the roller bearings constituting the drivable connection between the shaft and hub insures additional bearing surface between these two parts, which is especially desirable in instances wherein propellers embodying the present invention are employed on engines which develop a substantially high torque.

Though only two embodiments of the present invention have been shown and described herein, it is to be understood that the same is not limited thereto but may be embodied in various mechanical forms. It is also to be understood that various changes may be made in the relative sizes, shapes and location of the constituent parts of the invention without departing from the spirit thereof, and certain features may be employed without others if so desired. Other changes may also be made, as will now appear to those skilled in the art without departing from the scope of the invention as defined in the appended claims.

What is claimed is:

1. A variable pitch propeller comprising a rotatable shaft, a hub, a plurality of propeller blades rotatably carried by said hub, said hub being drivably connected with said shaft and rectilinearly movable with respect thereto to vary the pitch of the blades, and means independent of the drivable connection between the shaft and hub for counteracting the stresses between the hub and shaft due to the driving torque of the latter.

2. A variable pitch propeller comprising a rotatable shaft, a hub, means for drivably connecting said hub and shaft, a plurality of propeller blades rotatably mounted in said hub, pitch changing connections between said shaft and blades, and means for relieving the stresses between the hub and shaft due to the driving torque of the latter, said last-named means including a member under initial tension, and independent of the drivable connection between the hub and shaft and of said connections.

3. A variable pitch propeller comprising a rotatable shaft, a hub, a plurality of propeller blades rotatably carried by said hub, said hub being drivably connected with said shaft and rectilinearly movable with respect thereto to vary the pitch of the blades, and means for relieving the stresses between the hub and shaft due to the driving torque of the latter, said means including a plurality of members interconnected between said hub and shaft, one of said members being under initial tension.

4. A variable pitch propeller comprising a rotatable shaft, a hub drivably connected therewith, a plurality of blades rotatably mounted in the hub, means including said hub and responsive to the thrust of said blades for varying the pitch of the latter, and means independent of said first named means and of the drivable connection between the hub and shaft for relieving the stresses between said hub and shaft due to the driving torque of the latter.

5. In a variable pitch propeller having a plurality of blades, a rotatable shaft, means including a hub for drivably connecting said blades and shaft, means responsive to the thrust exerted by the blades for moving the hub rectilinearly of the shaft to vary the pitch of the blades, and means including a tension member interconnected between the hub and shaft for relieving the stresses due to the driving torque of the latter, said last-named means being independent of the drivable connection between the hub and shaft.

6. In a variable pitch propeller having a plurality of blades, a rotatable shaft, a hub for rotatably receiving said blades, means interiorly of the hub for drivably connecting the shaft and hub, said hub being movable rectilinearly of the shaft in response to the thrust of said blades for changing the pitch of the latter, and means for substantially counteracting the stresses in said first-named means due to the torque of the shaft including a drivable connection between said hub and shaft exteriorly of the hub.

7. In a variable pitch propeller having a plurality of blades, a rotatable shaft, means including a hub for drivably connecting the shaft and blades, said hub being automatically movable rectilinearly of said shaft for varying the pitch of the blades, a plurality of roller bearings for enabling substantially frictionless longitudinal movement of the hub relative to the shaft and for drivably connecting said hub and shaft, and separate means for compensating for a portion of the load on said bearings due to the torque of said shaft during operation of the propeller.

8. In a variable pitch propeller having a rotatable shaft, a hub surrounding said shaft and longitudinally movable with respect thereto, and means for drivably connecting said shaft and hub comprising a driving block secured to the shaft and having a plurality of longitudinally extending recesses, a plurality of longitudinally extending members secured to the hub and extending into said recesses, and a plurality of roller bearings disposed on either side of said members and positioned in said recesses.

9. In a variable pitch propeller having a plurality of blades, a rotatable shaft, a propeller hub surrounding said shaft and automatically longitudinally movable with respect to the shaft for varying the pitch of the blades, a member secured to said shaft and provided with a plurality of longitudinally extending recesses, a pair of longitudinally extending rows of roller bearings positioned within each of said recesses, and means interposed between each row of roller bearings in each recess for drivably connecting the hub and shaft.

10. In a variable pitch propeller having a plurality of blades, a rotatable shaft, a propeller hub surrounding said shaft and automatically movable longitudinally of said shaft in response to the thrust of the blades for varying the pitch of the latter, and means for drivably connecting said shaft and hub comprising a plurality of rows of roller bearings carried by said shaft, and members carried by said hub and positioned between adjacent rows of bearings.

11. In a variable pitch propeller having a plurality of blades, a rotatable shaft, a propeller hub surrounding said shaft and automatically movable longitudinally of said shaft in response to the thrust of the blades for varying the pitch of the latter, and means for drivably connecting said shaft and hub comprising a plurality of rows of roller bearings carried by said shaft, members carried by said hub and positioned between adjacent rows of bearings, and means for relieving the stresses in said roller bearings due to the driving torque of said shaft.

12. In a variable pitch propeller having a plurality of blades, a rotatable shaft, means including a hub for drivably connecting the shaft and blades, said hub being automatically movable longitudinally of said shaft for varying the pitch of the blades, a plurality of roller bearings for enabling substantially frictionless longitudinal movement of the hub relative to the shaft and for drivably connecting said hub and shaft, and means for relieving the stresses in said roller bearings due to the driving torque of said shaft, said last-named means including a tension member interconnecting the hub and shaft.

13. In a variable pitch propeller having a plurality of blades, a rotatable shaft, a hub for rotatably receiving said blades, means interiorly of the hub for drivably connecting said hub and shaft, and means exteriorly of the hub for drivably connecting said hub and shaft, one of said means being initially in tension.

14. A variable pitch propeller comprising a shaft, a hub, a plurality of blades carried by the hub, said hub being movable axially of the shaft to vary the pitch of the blades, a plurality of bearings interposed between the hub and shaft, and means for relieving the compression load on said bearings due to the torque of the shaft comprising a pair of members connected to the hub and shaft, and resilient means interconnecting said members.

15. In a variable pitch propeller having a plurality of blades, a shaft, a hub relatively movable with respect to the shaft for varying the pitch of the blades, means for drivably connecting said shaft and hub, and other means interconnecting said shaft and hub for reducing the torque load in said drivable connection during operation, said means comprising a member connected to the hub, a second member connected to the shaft, resilient means for operatively connecting said members, and means for adjusting the tension of said resilient means.

CLINTON H. HAVILL.